UNITED STATES PATENT OFFICE.

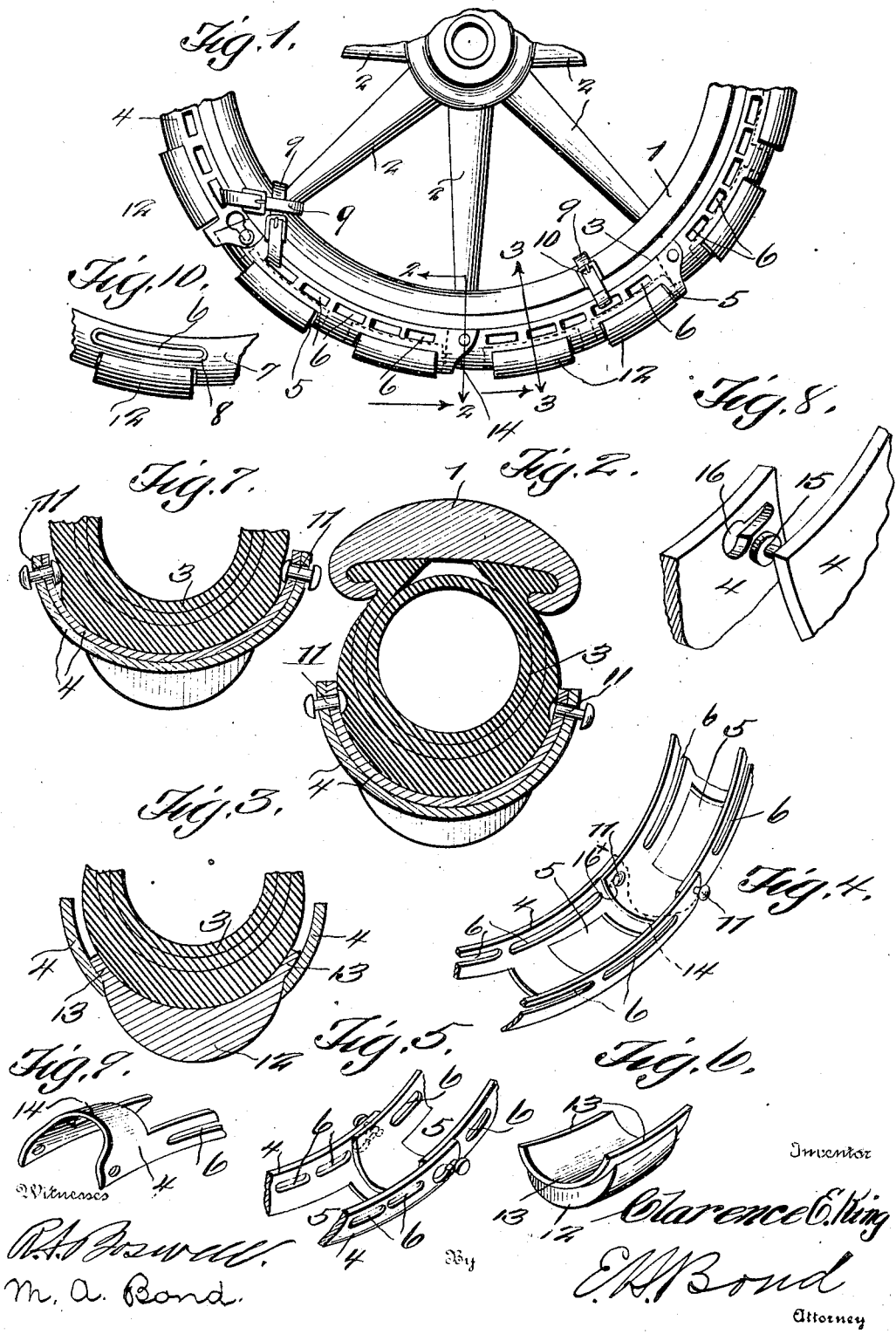

CLARENCE E. KING, OF WASHINGTON, DISTRICT OF COLUMBIA.

TIRE-PROTECTOR.

943,026.  Specification of Letters Patent.  Patented Dec. 14, 1909.

Application filed January 30, 1909. Serial No. 475,132.

*To all whom it may concern:*

Be it known that I, CLARENCE E. KING, a citizen of the United States of America, and resident of Washington, in the District of Columbia, have invented certain new and useful Improvements in Tire-Protectors, of which the following is a specification.

This invention relates to certain new and useful improvements in protectors for vehicle tires and more particularly to that class which are applied to the exterior of the tire in the nature of a sheath or casing, and it has for its objects among others to provide a simple and cheap, yet efficient and durable tire protector easily applied, and so constructed that any worn part may be readily replaced without destroying the remaining portions.

A further object of the invention is to provide for the lateral expansion of the protector when the tire becomes compressed or spread laterally as the portion thereof in contact with the ground receives the weight of the wheel or vehicle.

I provide further for the ready removal or insertion of a block or member whenever desired, as well as for the ready attachment of the protector to the vehicle rim so as to prevent creeping of the protector upon the latter.

Broadly stated, the protector comprises a member, of metal or other suitable material, given a curved form, approximately that of the pneumatic tire, and having perforations through which extend the wearing surfaces or blocks, of rubber, wood, concrete or any other suitable material, said curved member being formed in sections pivotally united and the pivotal connections being such as to allow of lateral expansion at the joints. The bearing blocks or surfaces have flanged portions curved to conform to the curvature of the tire and engaged with the inner surface of the curved member and held against outward displacement.

By the employment of my protector, the pneumatic tire may be of an inferior quality, and the life of old tires may be materially increased or lengthened.

Other objects and advantages of the invention will hereinafter appear and the novel features thereof will be particularly pointed out in the appended claims.

The invention is capable of embodiment in a variety of forms, the preferable ones of which are illustrated in the accompanying drawings, which, with the numerals of reference marked thereon, form a part of this specification, and in which—

Figure 1 is a side elevation of a portion of a vehicle wheel provided with my improvement. Fig. 2 is a section on the line 2—2 of Fig. 1, looking in the direction of the arrow. Fig. 3 is a sectional detail on the line 3—3 of Fig. 1, looking in the direction of the arrow. Fig. 4 is a perspective view looking at the inner face of the adjacent ends of two of the pivoted sections of the curved member. Fig. 5 is a similar view on a smaller scale showing the adjacent ends of the two sections which are united after the protecting casing has been placed upon the tire. Fig. 6 is a perspective detail of one of the bearing blocks removed. Fig. 7 is a view similar to Fig. 2 illustrating the lateral expansion at the pivots of the sections of the casing when the tire is compressed and laterally expanded. Fig. 8 is a perspective detail showing one form of means for connecting the ends of the casing after it is applied to the wheel. Fig. 9 is a perspective view of a portion of one of the sections of the base member. Fig. 10 is a detail in side elevation showing a modified construction.

Like numerals of reference indicate like parts in the several views.

Referring to the drawings, 1 designates the rim, 2 the spokes and 3 the pneumatic tire of a vehicle wheel of any well-known or approved form of construction.

My present improvement comprises a protector or casing or sheath for the pneumatic tire. It comprises a base member or holder composed of a plurality of sections, of any given number, each section 4 being given a curved or concave form, approximately that of the curvature of the tire under normal conditions. These sections may be of any suitable material, stamped or otherwise formed into the desired shape, of sheet metal, galvanized iron, aluminum, copper or other material suited to the purpose. Each section is formed with one or more perforations 5 in its peripheral face, and the substantially parallel or side edges may or may not be provided with perforations 6, as seen clearly in Figs. 1, 4, 5 and 9. These perforations, when present, may be of any desired length and frequency and, when the base member is formed of leather or such material, as seen at 7 in Fig. 10, these perforations or slots may be suitably reinforced by metal or any other suitable material, in any well-known way, as seen at 8 in said Fig. 10. These slots or perforations serve to lighten the base member and also serve as means of connection of the straps 9 provided with buckles 10 and engaged about the rim 1 for the purpose of holding the base member in proper position with relation to the tire. In order to prevent creeping of the protector upon the tire, these straps may be arranged as shown at the left of Fig. 1 where they are illustrated as crossed so as to engage upon opposite sides of a spoke. As many of these crossed straps as may be deemed necessary may be employed upon the wheel. Any other suitable means, however, may be employed for securing the protector to the tire or for preventing it from creeping thereupon.

The sections 4 of the base member are pivotally connected and, for this purpose, the adjacent ends of adjoining sections are overlapped, as seen clearly in Figs. 1, 2, 4, 5 and 7. In this instance, I have shown rivets 11 for connecting these overlapped ends. These rivets pass through such overlapped ends, and, in order to permit of the necessary lateral expansion at these pivotal points, I make the rivets of greater length than the combined thicknesses of the two overlapped sections, as seen very clearly in Figs. 2, 4 and 7. In Fig. 2, the parts are shown with the rivets in the position they assume under normal conditions, it being noted that the edges of the sections of the base member closely embrace the tire and the length of the rivets provides sufficient room for outward movement of these overlapped ends when the weight of the vehicle is upon the lowermost section, that is, that which at that time is nearest the ground. At this time, the position of the parts will be that seen in Fig. 7 wherein it will be noted that the edges of the base member are laterally expanded or pressed outward by the compression of the tire. As soon as the wheel revolves so that the laterally expanded member is moved out of engagement with the ground, the parts spring back to their normal position, that seen in Fig. 2, the loose rivets allowing such movement and yet holding the overlapped ends in proper position.

12 designates the wearing or bearing blocks or members. They are curved in cross section to conform to the curvature of the tire and are provided with a surrounding flange 13 which projects not only at the sides but at the ends, as seen clearly in Fig. 6. These blocks or members may be of rubber, wood, composition or any other material found best suited to the purpose. They are formed separately and put in position by passing through from the inner side of the base member so that the blocks proper project through the aperture 5 in said base member and the flanged portion 13 has a material bearing all around against the inner face of the base section, as indicated clearly in Fig. 3, so that the blocks are held against being forced outward and displaced from their position within the base member of the casing. In order to allow sufficient movement of the sections of the base member one upon the other upon their pivots to permit the removal of a worn or damaged block and the insertion of another, I cut away one end of each section, as seen at 14 in Figs. 1 and 9 and as indicated by dotted lines in Fig. 4, this cut away portion, however, being protected by the lapped end of the adjacent section, as will be readily understood.

In practice, the requisite number of sections 4 to approximately embrace the tire are provided and the protector placed around the tire which may be slightly compressed so that the ends of the protector may be overlapped and brought into substantially the position seen in Fig. 8. The ends may be fastened in any suitable manner. In Fig. 8 I have illustrated one simple form of means which comprises a headed pin or stud 15 on the end of one section and a keyhole or similar slot 16 on the adjacent end of the other section, the adjacent ends being overlapped sufficiently to allow the head of the stud to pass through the enlarged portion of the slot, and then the expansion of the tire will spread the protector and bring the stud into the narrowed member of the slot in a manner which will be readily understood.

In use the blocks 12 contact with the ground and take the wear, their flanges expanding to conform to the expansion of the tire and yet not sufficiently to allow them to be accidentally forced out of their aperture in the base member If it be found necessary to allow slight endwise movement of the sections 4 to compensate for the expansion or compression of the tire, this may be easily permitted by slightly elongating the slots in which the rivets 11 work, as indicated at 16$^x$ in Fig. 4.

If necessary, more than one keyhole slot may be provided in the overlapped end of one of the members to provide for any necessary adjustment of the length of the protector.

From the above, it will be seen that I have devised a simple and efficient protective casing for automobile tires and the like, and, while the structural embodiment of the invention as herein disclosed is what I at the present time consider preferable, it is evident that the same is subject to changes, variations and modifications in detail, proportion of parts etc., and I therefore do not wish to be restricted to the particular construction and arrangement herein disclosed, but reserve the right to make such changes, variations and modifications as come properly within the scope of the protection prayed.

What I claim as new is:—

1. A tire protector consisting of a base member of pivotally united curved sections having perforations in their peripheral faces, and separately formed blocks retained within and projecting through perforations in said base member, said blocks being curved to conform to the curvature of the base member and having their inner faces curved to conform to the curvature of the tire.

2. A tire protector embodying a base member of curved sections having overlapped ends, said overlapped ends being provided with coincident openings, and means passed through said openings for pivotally uniting said sections, said means being of greater length than the combined thickness of the overlapped portions of the sections and freely movable within said openings.

3. A tire protector composed of pivotally united sections curved to conform to the curvature of the tire, the pivots of said sections constructed to permit lateral expansion, said sections being peripherally perforated, and flanged bearing blocks projecting through said perforations, the parallel portions of said sections being provided with longitudinally disposed slots.

4. A tire protector comprising a base member of curved overlapped sections with peripheral perforations, one end of each section being longitudinally cut away, means pivotally uniting the overlapped sections and allowing lateral expansion thereof, and flanged blocks inserted from the inner side of the base member and projecting through said perforations, said blocks being curved to conform to the curvature of the tire, the ends of the base member being provided with interlocking securing means.

Signed by me at Washington D. C. this 30th day of January 1909.

CLARENCE E. KING.

Witnesses:
 ROBERT A. BOSWELL,
 E. H. BOND.